US008743388B2

(12) United States Patent
Ahmed et al.

(10) Patent No.: US 8,743,388 B2
(45) Date of Patent: Jun. 3, 2014

(54) ACCESS TO NETWORKED PERIPHERAL DEVICE FOR IMPAIRED USERS

(75) Inventors: Mohamed Nooman Ahmed, Louisville, KY (US); Amanda Kay Bridges, Winchester, KY (US); Stuart Willard Daniel, Lexington, KY (US); William James Gardner Flowers, Lexington, KY (US); Charles Edward Grieshaber, Versailles, KY (US); Dennis Herbert Hasselbring, Lexington, KY (US); Michael Earl Lhamon, Lexington, KY (US); Chad Eugene McQuillen, Lexington, KY (US); Michael Ray Timperman, Versailles, KY (US)

(73) Assignee: Lexmark International, Inc., Lexington, KY (US)

( * ) Notice: Subject to any disclaimer, the term of this patent is extended or adjusted under 35 U.S.C. 154(b) by 961 days.

(21) Appl. No.: 11/555,071

(22) Filed: Oct. 31, 2006

(65) Prior Publication Data

US 2008/0144077 A1 Jun. 19, 2008

(51) Int. Cl.
*G06F 3/12* (2006.01)
*G06F 3/16* (2006.01)
*G06F 3/00* (2006.01)
*G06K 15/00* (2006.01)
*G10L 21/00* (2013.01)
*G10L 25/00* (2013.01)
*G10L 21/06* (2013.01)

(52) U.S. Cl.
USPC ........ 358/1.15; 358/1.13; 358/1.14; 715/865; 715/727; 715/729; 704/275; 704/271; 704/270

(58) Field of Classification Search
USPC ............. 358/1.15, 1.14, 1.13, 1.18, 1.16, 1.6, 358/1.9, 402, 403, 405, 407, 434, 435, 436, 358/442, 443, 468; 715/764, 808, 865, 700, 715/707, 727, 729, 733, 737, 745, 748; 345/710, 747, 744; 704/270, 274, 275, 704/271; 434/112, 116; 340/4.1, 4.11, 4.12, 340/4.13, 4.14

See application file for complete search history.

(56) References Cited

U.S. PATENT DOCUMENTS

| | | | |
|---|---|---|---|
| 4,414,537 A | 11/1983 | Grimes | |
| 5,589,855 A | 12/1996 | Blumstein et al. | |
| 5,642,131 A | 6/1997 | Pekelney et al. | |
| 5,734,923 A | 3/1998 | Sagawa et al. | |
| 5,736,978 A | 4/1998 | Hasser et al. | |
| 5,896,129 A | 4/1999 | Murphy et al. | |
| 5,959,530 A * | 9/1999 | Lupien et al. | 340/568.1 |
| 6,061,666 A | 5/2000 | Do et al. | |
| 6,140,913 A * | 10/2000 | Okada et al. | 340/407.2 |
| 6,267,598 B1 | 7/2001 | Allen, Jr. et al. | |
| 6,278,441 B1 | 8/2001 | Gouzman et al. | |
| 6,307,640 B1 * | 10/2001 | Motegi | 358/1.14 |
| 6,384,743 B1 * | 5/2002 | Vanderheiden | 341/21 |
| 6,464,135 B1 | 10/2002 | Cohen et al. | |
| 6,474,881 B1 * | 11/2002 | Wanda | 400/61 |
| 6,476,927 B1 * | 11/2002 | Schwarz, Jr. | 358/1.15 |
| 6,496,182 B1 | 12/2002 | Wong et al. | |

(Continued)

*Primary Examiner* — Barbara Reinier
*Assistant Examiner* — Jonathan Beckley (57) ABSTRACT

A method for controlling a peripheral device includes receiving input from a user at a workstation adapted to the user, determining whether the received input can be valid, generating a job ticket from the valid input, sending the job ticket to the peripheral device and receiving an identifier representing the job ticket from the peripheral device.

16 Claims, 5 Drawing Sheets

(56) References Cited

U.S. PATENT DOCUMENTS

| | | |
|---|---|---|
| 6,549,789 B1 | 4/2003 | Kfoury |
| 6,636,202 B2 | 10/2003 | Ishmael, Jr. et al. |
| 6,760,408 B2 | 7/2004 | Crosson et al. |
| 6,828,918 B2 * | 12/2004 | Bowman et al. ............... 340/4.1 |
| 6,856,333 B2 | 2/2005 | Ullmann et al. |
| 6,874,034 B1 * | 3/2005 | Hertling ....................... 709/245 |
| 6,883,981 B2 | 4/2005 | Kizaki et al. |
| 6,917,437 B1 | 7/2005 | Myers et al. |
| 6,918,091 B2 | 7/2005 | Leavitt et al. |
| 6,950,205 B2 | 9/2005 | Takeo |
| 6,952,577 B2 | 10/2005 | Michaelis et al. |
| 6,999,066 B2 * | 2/2006 | Litwiller ....................... 345/173 |
| 7,027,175 B2 * | 4/2006 | Robertson ................... 358/1.15 |
| 7,082,574 B2 * | 7/2006 | Ogino et al. ................. 715/764 |
| 7,162,685 B2 * | 1/2007 | Saito ............................ 714/813 |
| 7,310,162 B2 * | 12/2007 | Morris-Jones ............... 358/1.15 |
| 7,633,644 B2 * | 12/2009 | Lum et al. ................... 358/1.16 |
| 7,636,757 B2 * | 12/2009 | Kemp et al. .................. 709/208 |
| 7,812,989 B2 * | 10/2010 | Corona et al. ............... 358/1.15 |
| 8,185,957 B2 * | 5/2012 | Ahmed et al. ................. 726/26 |
| 8,228,521 B2 * | 7/2012 | Osamura et al. ............. 358/1.14 |
| 8,264,716 B2 * | 9/2012 | Ola et al. ..................... 358/1.15 |
| 2001/0017712 A1 * | 8/2001 | Kasatani ....................... 358/1.15 |
| 2005/0052686 A1 * | 3/2005 | Maruyama .................. 358/1.15 |

\* cited by examiner

ACCESS TO NETWORKED PERIPHERAL DEVICE FOR IMPAIRED USERS

CROSS REFERENCES TO RELATED APPLICATIONS

This application relates to U.S. non-provisional patent applications titled, "Supplemental Sensory Input/Output for Accessibility" and "Peripheral Device," both of which were filed contemporaneously herewith.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The present invention relates generally to printers and multi-function peripheral (MFP) devices, and more particularly to access to networked peripheral devices for users.

2. Background

Many of today's networked printers, networked MFP devices and other networked information technology (IT) devices support "walk-up" user-initiated functions such as confidential print, copy, facsimile, and so forth. A user interface (UI) typically enables a selection of a function and related attributes to be entered for the selected function.

These devices often employ a touch screen UI, which requires a user to be able to visually see and discern information presented on the UI to select a function and/or select attributes associated with the selected function. This can restrict a disabled or impaired user's ability to use the device.

In 1998, Congress amended the Rehabilitation Act to require Federal agencies to make their electronic and information technology accessible to people with disabilities. Inaccessible technology interferes with an individual's ability to obtain and use information quickly and easily. Section 508 was enacted to eliminate barriers in information technology, to make available new opportunities for people with disabilities, and to encourage development of technologies that will help achieve these goals. The law applies to all Federal agencies when they develop, procure, maintain, or use electronic and information technology. Under Section 508 (29 U.S.C. §794d), agencies must give disabled employees and members of the public access to information that is comparable to the access available to others.

SUMMARY OF THE INVENTION

The present invention provides methods and apparatuses, including computer programs, for accessing networked peripheral devices.

In general, in one aspect, the present invention features a method for a user to control a peripheral device, including receiving an input from the user at a workstation adapted to the user, determining whether the received input is valid, generating a job ticket from the valid input, sending the job ticket to the peripheral device, and receiving an identifier representing the job ticket from the peripheral device. The method may also include signaling the user in response to the determining whether the received input is valid. The method may also include receiving a completion indication from the user.

In embodiments, the input can include one or more alphanumeric characters representing one or more peripheral device functions and associated attributes, parameters or instructions.

Determining can include checking or verifying that the received input represents valid peripheral device functions or associated attributes, parameters or instructions.

Signaling can include a first audio sound signifying the received input is valid, and a second audio sound signifying the received input is invalid. Signaling can also include a first visual indication signifying valid input was received and a second visual indication signifying invalid input was received.

The job ticket can include a request for the peripheral device to perform a function. The job ticket can also include one or more attributes, parameters or instructions associated with such function.

In another aspect, the present invention features a method to control a networked peripheral device including receiving an input from a user at an input/output (I/O) device adapted for the user, determining whether the received input is valid, sending the valid input to the networked peripheral device, and receiving, from the networked peripheral device, an identifier representing the valid input. The method may also include signaling the user in response to the determining whether the received input is valid. The method may also include receiving a completion indication from the user.

In embodiments, the input can include one or more alphanumeric characters representing one or more peripheral device functions and associated attributes, parameters or instructions.

Determining can include checking or verifying that the received represents valid peripheral device functions or associated attributes, parameters or instructions.

Signaling can include a first audio sound signifying valid received input, and a second audio sound signifying invalid received input. Signaling can also include a first visual indication signifying valid received input, and a second visual indication signifying invalid received input.

The valid input can include a request for the peripheral device to perform a function. The valid input can also include one or more attributes, parameters or instructions associated with such function.

In another aspect, the present invention features a method of executing a job ticket in an MFP device including assigning an identifier to a job ticket received over a network from a user, storing the job ticket by the identifier, receiving input at the MFP device, and executing the job ticket associated with the identifier if the input received matches the identifier. The method may also include signaling negative feedback if the input received fails to match the identifier and signaling positive feedback if the input received matches the identifier.

In embodiments, signaling can include a first audio sound signifying the negative feedback and a second audio sound signifying the positive feedback.

The job ticket can include a request for the MFP device to perform a function. The job ticket may also include one or more attributes, parameters or instructions associated with the function.

The present invention can be implemented to realize one or more of the following advantages.

Methods enable a user to retrieve a predefined job ticket (i.e., a request for a device to perform a function including a selection of one or more associated attributes, parameters or instructions) created by the user at the user's adaptive workstation. The user can submit the job ticket for the device to process independent of the user's ability to discern visual information presented on a standard UI. The methods may also result in the user having to spend less time at the device.

One implementation of the present invention provides all of the above advantages.

BRIEF DESCRIPTION OF THE DRAWINGS

The above-mentioned and other features and advantages of the present invention, and the manner of attaining them, will become more apparent, and the present invention will be better understood by reference to the following description of embodiments of the present invention in conjunction with the accompanying drawings, wherein.

Like reference numbers and designations in the various drawings indicate like elements.

DETAILED DESCRIPTION

It is to be understood that the present invention is not limited in its application to the details of construction or the arrangement of components set forth in the following description or illustrated in the drawings. The present invention is capable of other embodiments and of being practiced or of being carried out in various ways. Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Unless limited otherwise, the terms "connected," "coupled," and "mounted," and variations thereof are used broadly and encompass direct and indirect connections, couplings, and mountings. In addition, the terms "connected" and "coupled" and variations thereof are not restricted to physical or mechanical connections or couplings.

In addition, it should be understood that embodiments of the present invention may include both hardware and electronic components or modules that, for purposes of discussion, may be illustrated and described as if the majority of the components were implemented solely in hardware. However, one of ordinary skill in the art, based on a reading of this detailed description, would recognize that, in at least one embodiment, the electronic based aspects of the present invention may be implemented in software. As such, it should be noted that a plurality of hardware and software-based devices, as well as a plurality of different structural components may be utilized to implement the present invention. Furthermore, as described in subsequent paragraphs, the specific mechanical configurations illustrated in the drawings are intended to exemplify embodiments of the present invention, and other alternative mechanical configurations are possible.

Figure 1:
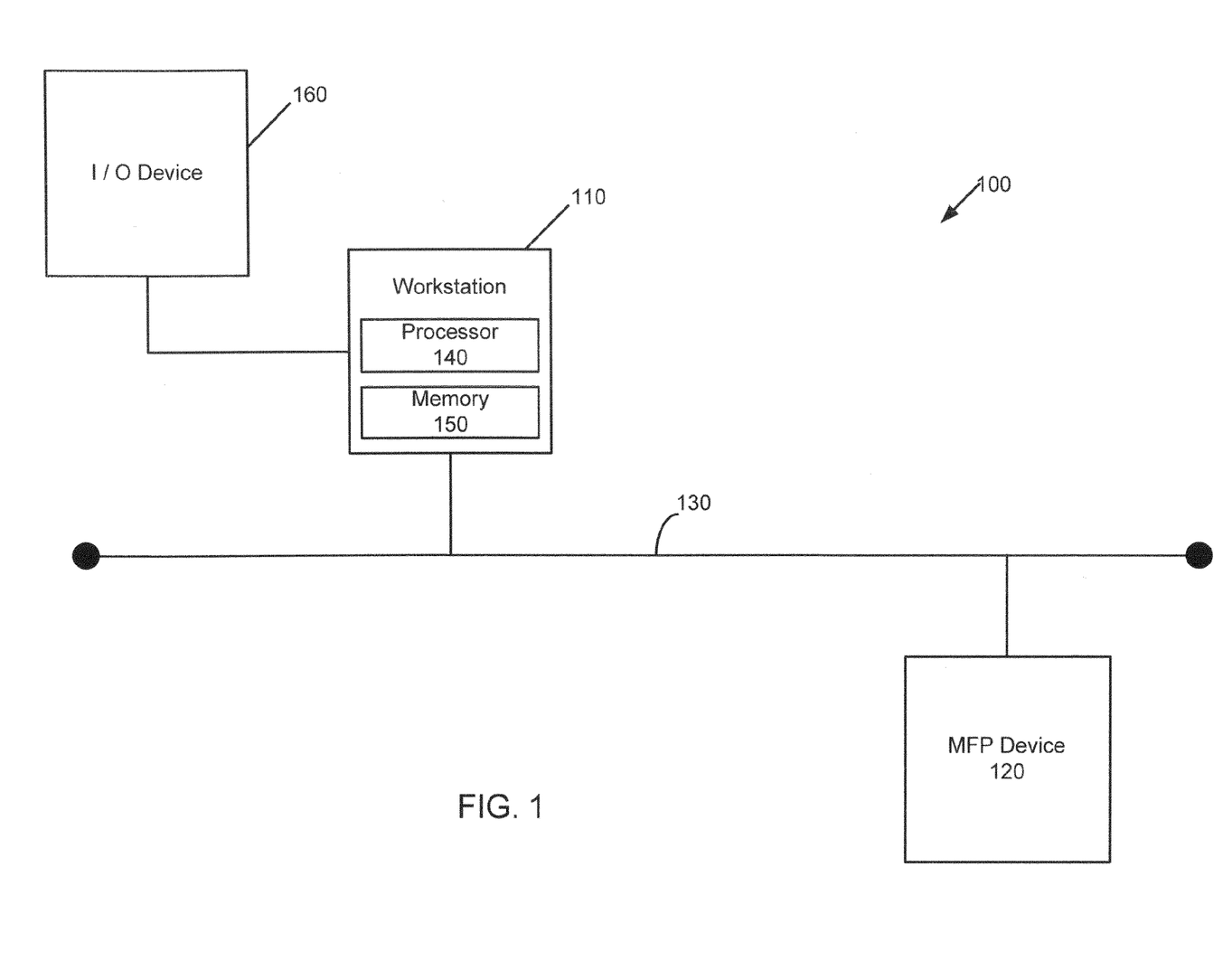
FIG. 1 is a block diagram of an exemplary system.

As shown in FIG. 1, an exemplary system 100 includes a user's workstation 110 connected to an all-in-one, mopier or multifunction peripheral (MFP) device 120 via a network 130. The user's workstation 110 is adapted to a user with a disability, such as a disability in seeing, hearing, performing manual tasks or working and may include a processor 140, memory 150 and input/output (I/O) device 160. I/O device 160 is one of assistive technology adapted for use by the user and can include an interactive voice response system, large viewing screen, a screen reader, touch screen, keyboard, mouse, voice recognition system, digital ink pen, track pad, track ball and/or sound generating device. As such, I/O device 160 enables input discernable by sight (e.g., color, size, graphics), touch (e.g., size, shape, location), and/or sound (e.g., tone generation). Given that that workstation 110 and I/O device 160 has been selected and configured specifically for a user with a specific disability, this working environment is generally referred to as being such user's "comfort zone."

Network 130 may be any suitable communication network or system, such as the Internet, the telephone system, wireless networks, satellite networks or cable TV networks. Network 130 may also be one or more networks, and various private and public networks could be used in various combinations to provide the communication links desired or needed to create embodiments or implementations of the present invention, as would be apparent to one of ordinary skill in the art. Thus, the present invention is not limited to any specific network or combinations of networks.

MFP device 120 is an office machine that is capable of performing multiple functions, such as printing, copying, faxing, scanning, and e-mailing or any combination thereof. Components of MFP device 120 can include a printer or printing unit; scanner, scanning unit or scanning system; copier; facsimile; media card readers units; and/or hard disk. MFP device 120 can work both as a computer peripheral (using a computer port, like ethernet/Wi-Fi-LAN, USB, or FireWire) and as a stand-alone device (i.e., with no need for a computer connection) to perform functions such as copying, e-mailing or faxing.

Figure 2:
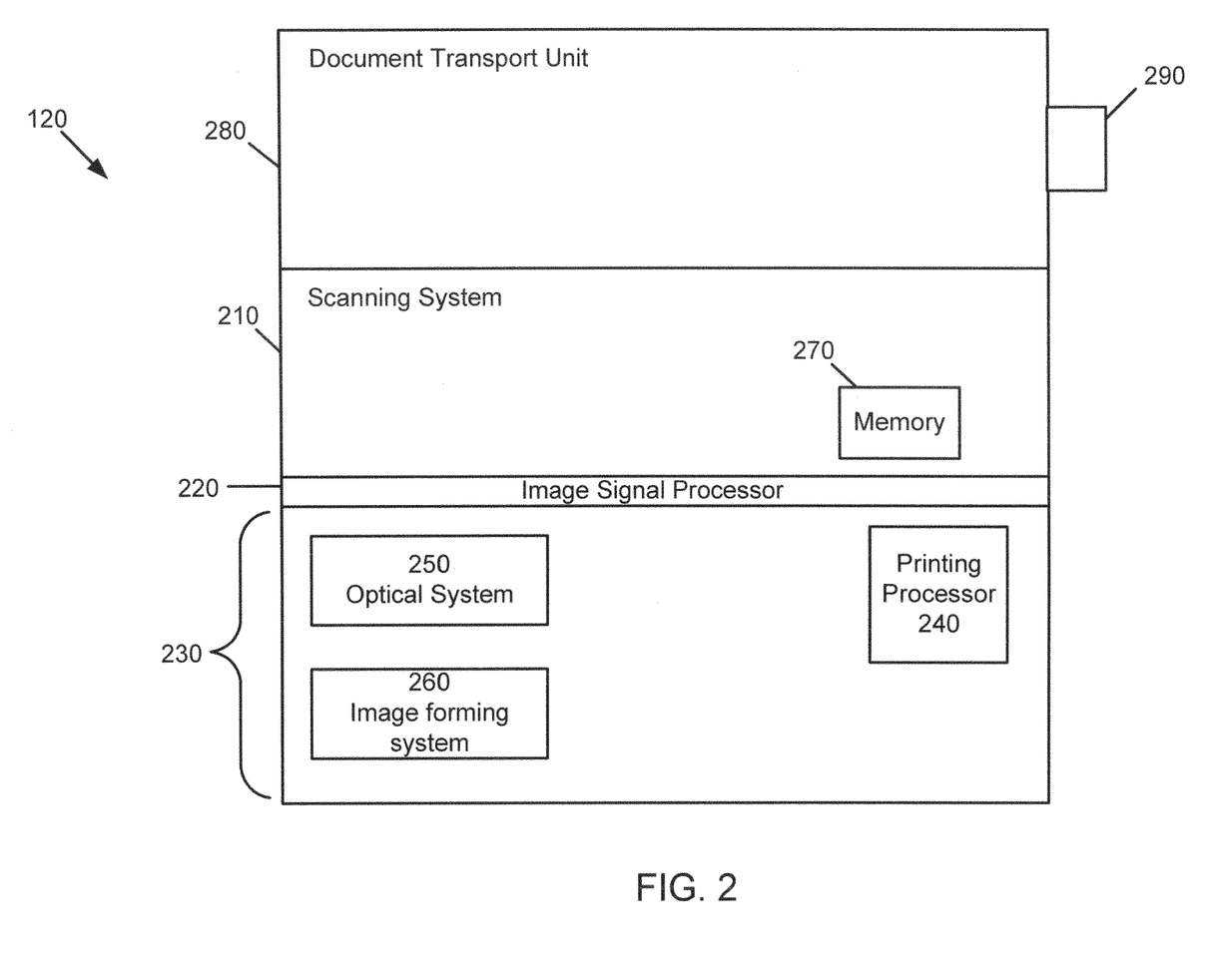
FIG. 2 is a block diagram of an exemplary multifunction peripheral (MFP) device.

As shown in FIG. 2, MFP device 120 can include a scanner, scanning unit or scanning system 210 and an image signal processor 220. MFP device 120 can also include a printer or printing unit 230 having a printing processor 240, an optical system 250, and an image forming system 260. MFP device 120 may also include a memory 270, a document transport unit 280, and an operation (e.g., input/output) panel 290. Operation panel 290 is attached to the MFP device 120 for initiating walk-up operations or functions, such as copying, faxing, scanning, or e-mailing, and for displaying device options or conditions, such as duplex copying or stapling. In an alternate embodiment, operation panel 290 may be integrated or housed within MFP device 120.

Scanning system 210 reads a document and converts the obtained data into image data. Memory 270 transmits image data and color data, if applicable, to printing unit 230 either directly, or through a memory installed therein. The image data and color data may also be transmitted to a users workstation or computer for further processing or storage. The image data and color data may also be transmitted to a desired destination by facsimile or electronic mail.

Figure 3:
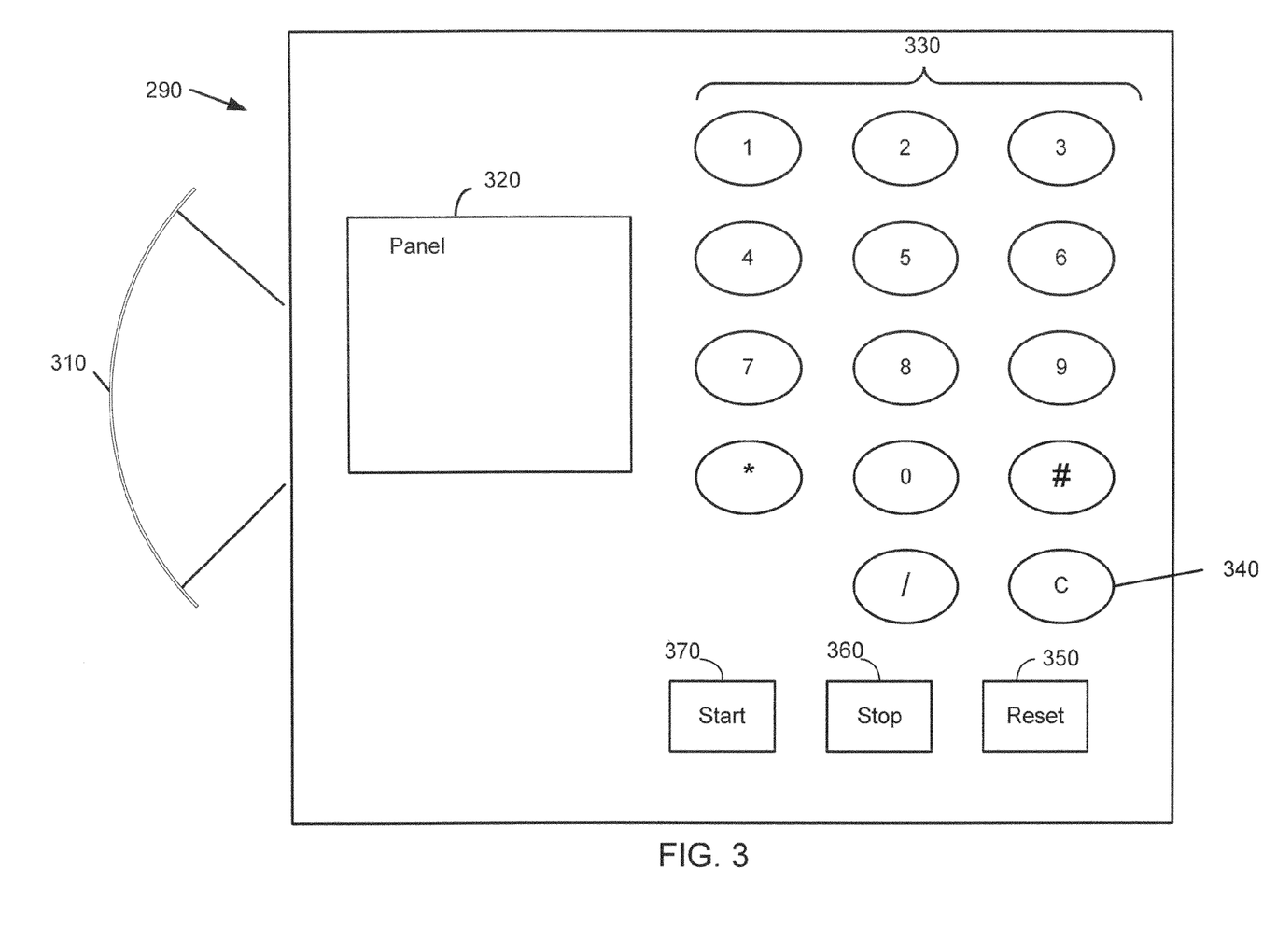
FIG. 3 is a block diagram of an exemplary operation panel adapted to the MFP of FIG. 2.

As shown in FIG. 3, operation panel 290 can include, for example, a signaling device 310, such as a sound generating or audio signaling device (e.g., beeper, tone generator, audio speaker, and so forth) and a display screen or touch panel 320 for indicating a warning, such as jamming, a service man call, and paper empty, or other information, attributes or conditions such as a threshold level, magnification ratio, and copy sheet size. Operation panel 290 may also include a keypad or key group 330 for entering input such as the desired number of copies and magnification ratio; a clear key 340 for clearing input entered at keypad 330; a panel reset key 350 for clearing all of the set conditions; a stop key 360 for stopping or halting operation of MFP device 120 and a start key 370 for starting or commencing the current or desired operation.

Signaling device 310 provides additional assistance for users with disabilities. For example, as shown FIG. 3, signaling device 310 is an audio signal device for assisting a vision-impaired user who may not be able to discern visual indications on the touch panel 320.

The exemplary description below details operation panel 290 and I/O device 160 for a vision-impaired user. However, as will be appreciated by one of ordinary skill in the art, other systems may be designed or implemented for other types of disabilities.

Referring back to FIG. 1, in one example, using workstation 110 and/or I/O device 160, which may be specifically configured to assist a user with a disability, the user can setup, pre-program, emulate or request a walk-up operation or function, such as copying, faxing, scanning, or e-mailing, from the user's workstation instead of at MFP device 120. This request is accomplished by creating a job ticket or work order and depositing or storing that job ticket in networked MFP device 120, as illustrated by process 400 in FIG. 4.

Figure 4:
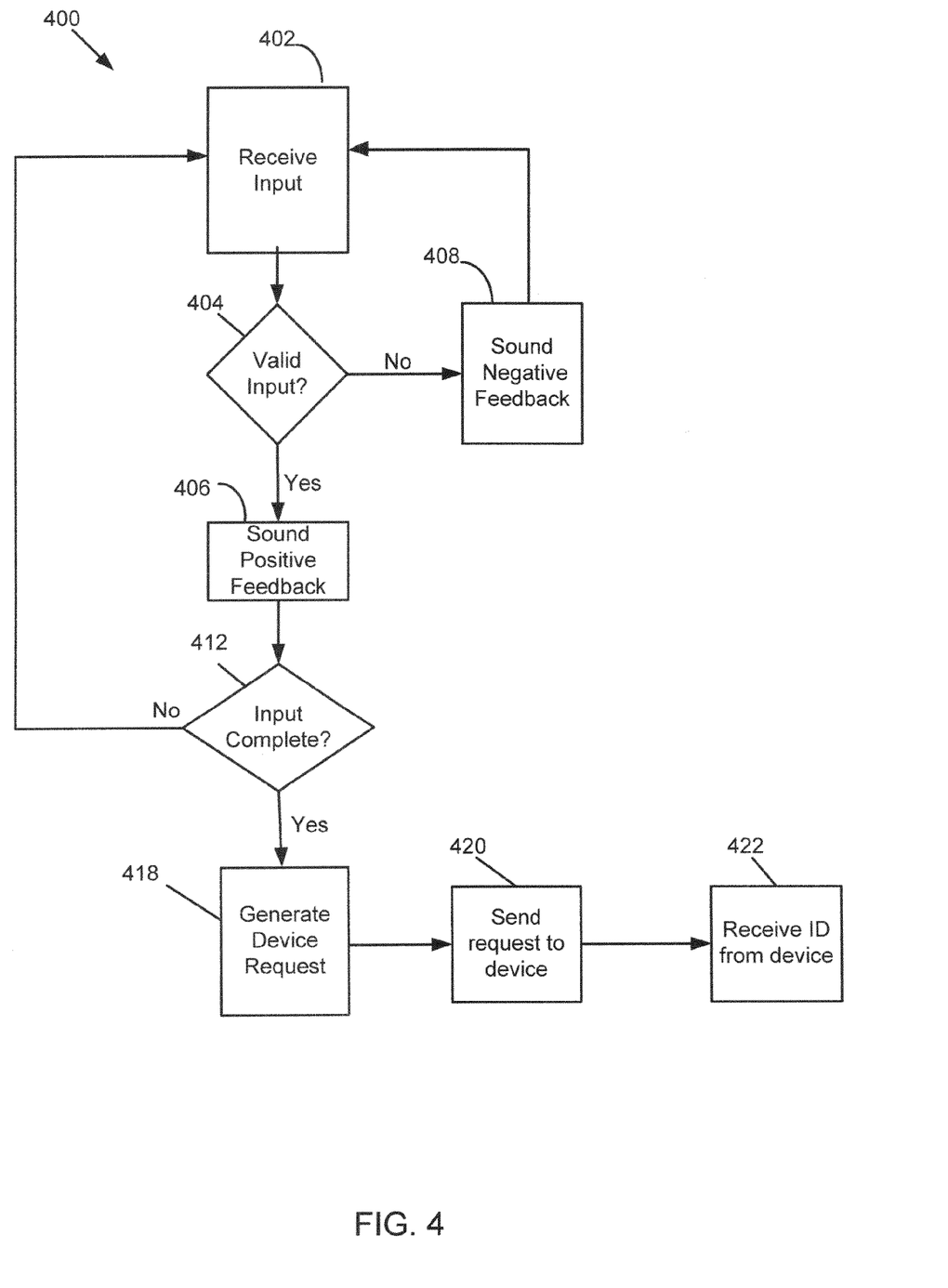
FIG. 4 is a flow diagram of an exemplary process to create a job ticket in accordance with the present invention.

At block 402, I/O device 160 receives input corresponding to the desired walk-up operation or function from the user. Such input may be a request to setup the desired function or an attribute, instruction or parameter associated with the function to be performed. For example, if the desired operation is to make a copy, associated attributes may include input sides, output sides, number of pages per copy, and number of copies. For facsimile functions, the associated attributes may be the destination fax number, input sides and delayed send option. For electronic mail, the associated attributes and parameters may include the destination e-mail address and input sides.

Input may be entered in any format recognizable by MFP device 120. For example, input may be one or more alphanumeric characters entered through a keyboard or touchscreen; selections made by clicking on desired attributes, instructions or parameters with a mouse or other input device; or verbal responses recorded as a list of desired attributes, instructions or parameters are read to the user.

Validation of the input occurs at block 404. Validation includes verifying the input received is valid. For example, validation may help ensure that the function requested is recognized by MFP device 120 or that the attributes, parameters or instructions inputted can be associated with the selected function. Validation may further include checking to make sure that required parameters have been set.

Once validation 404 has been performed, feedback may be provided to the user through I/O device 160 at workstation 110 (block 406, 408). Positive feedback, which indicates that progress is being made towards the successful creation of a job ticket, may be signaled for valid inputs (block 406), and negative feedback may be signaled for invalid inputs (block 408). After the user receives the feedback, positive or negative, the user may re-input the invalid function request, attribute, instruction or parameter or continue inputting or selecting additional function requests attributes instructions or parameters. The input, validation and feedback processes may be repeated until all desired attributes, instructions or parameters have been defined or an indication that the setup operation is complete, such as an end of input indicator or job creation indicator, a perform function signal, or a job submission indicator, is received (block 412). It will be appreciated by one of ordinary skill in the art that validation of job ticket may also occur after a predetermined number of inputs or after an indication is received rather than after each individual input.

At block 418, the job ticket or work order, based upon the input received from the user at workstation 110 using I/O device 160 is generated or created. The data format of job ticket may be any format recognizable by MFP device 120, such as XML format or HTML format. The job ticket is then sent to MFP device 120 via network 130 (block 420). At block 422, a job identifier or ID associated with the job ticket is received from MFP device 120 via network 130 at workstation 110. The job identifier can be any identifier capable of being presented at MFP device 120, such as alphanumeric or numeric characters, hotkeys or functions keys.

Figure 5:
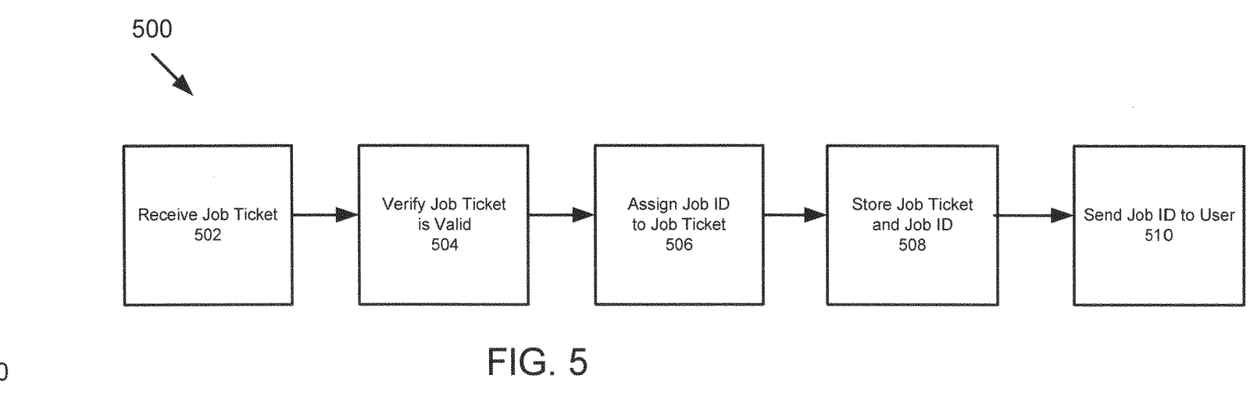
FIG. 5 is a flow diagram of an exemplary process to generate an identifier in accordance with the present invention.

The process 500 for creating a job identifier or ID is described in FIG. 5. Once MFP device 120 receives the job ticket (block 502), it may check or verify that the received job ticket is of a valid form (block 503). For example, MFP device 120 can check to make sure there was no error in the job ticket transmission to MFP device 120. MFP device 120 may also verify that MFP device 120 has the capability to perform the desired function, such as by querying the capabilities of MFP device 120. Verification can further include verifying that required parameters of the desired function have been set. For example, for an electronic mail function, MFP device 120 may verify that the job ticket includes the destination e-mail address; and for a facsimile function, MFP device 120 may verify that the job ticket includes the destination facsimile number.

At block 506, MFP device 120 stores the job ticket and assigns a job identifier or ID to the job ticket. The job identifier is then stored at MFP device 120 (block 508). At block 510, the job identifier is also returned, communicated or sent via network 130 to workstation 110 and communicated to the user so that the user can proceed to MFP device 120 with the knowledge that the desired MFP function request, together with any associated instructions, attributes or parameters to facilitate such request, have been preloaded and are accessible via the job identifier.

Figure 6:
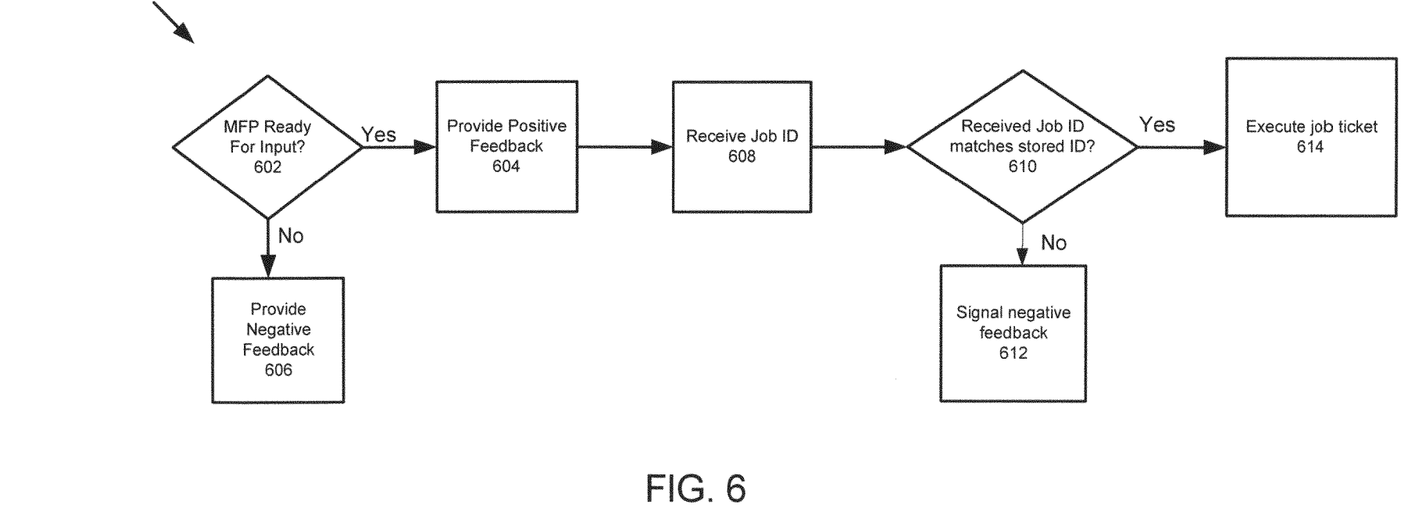
FIG. 6 is a flow diagram of an exemplary process to execute a job ticket in accordance with the present invention.

One exemplary process 600 for executing the desired function request is illustrated in FIG. 6. In this example, using the operation panel 290 at MFP device 120, the user can locate and activate or press a preset or predetermined button or key, such as an idle key, to begin the job execution process. At block 602, MFP device 120 may verify whether the device is ready to receive and perform requested functions. MFP device 120 may also provide the appropriate ready state feedback (block 604) to the user, such as through an audio signal or visual display on operation panel 290. For example, if MFP device 120 is not in a ready state, it may provide negative feedback, such as. a "razz" sound, to indicate that a request cannot be honored, possibly due to, for example, MFP device 120 being in an intervention required state (e.g., out of paper or network down) and that further input is futile. If MFP device 120 is in a ready state, it may provide positive feedback, such as a "ding" sound to indicate that requests can be honored and that MFP device 120 is ready for the user to select or input a function.

Once the user is notified that the MFP device 120 is ready, the user can enter the job identifier at MFP device 120 (block 608). MFP device 120 verifies that a valid job identifier is received (block 610). If a valid job identifier was received, MFP device 120 may automatically and immediately execute the job associated with the job identifier (block 614). MFP device 120 may also wait until it receives an indication from the user, such as by another key or button press, that the user is ready for the job to be performed before actually executing the job.

If the job ID received by MFP device 120 is not recognized or is invalid, MFP device 120 may provide negative feedback, such as through an audio signal or visual display on the operation panel 290 of MFP device 120 (block 612), so that the user is notified that the expected job cannot be completed.

Embodiments of the present invention can be implemented in digital electronic circuitry, or in computer hardware, firmware, software, or in combinations of thereof. Embodiments of the present invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

The exemplary embodiments of the present invention can be performed by one or more programmable processors executing a computer program to perform functions of the present invention by operating on input data and generating output. The exemplary embodiments can also be performed by, and apparatus of the present invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

The foregoing description of several methods and an embodiment of the present invention have been presented for purposes of illustration. It is not intended to be exhaustive or to limit the present invention to the precise steps and/or forms disclosed, and obviously many modifications and variations are possible in light of the above teaching. It is intended that the scope of the present invention be defined by the claims appended hereto.

What is claimed is:

1. A method of performing an image capture operation at a peripheral device, comprising:
    receiving, by the peripheral device, a pre-programmed image capture operation request from a user at a workstation adapted to the user;
    determining whether the received pre-programmed image capture operation request represents at least one valid request for the peripheral device to perform an image capture operation including at least one associated attribute;
    generating a job ticket from the valid pre-programmed image capture operation request;
    generating, by the peripheral device, a first identifier associated with the job ticket for performing the image capture operation in the peripheral device;
    storing, in the peripheral device, the first identifier associated with the job ticket;
    sending the first identifier from the peripheral device to the user via the workstation;
    receiving, by the peripheral device, a second identifier from the user;
    determining if the second identifier corresponds to the first identifier; and
    if the second identifier corresponds to the first identifier, performing by the peripheral device the image capture operation corresponding to the received pre-programmed image capture operation request.

2. The method of claim 1, wherein the pre-programmed image capture operation request includes at least one alphanumeric character.

3. The method of claim 1, further comprising signaling the user in response to the determining whether the received pre-programmed image capture operation request represents the at least one valid request for the peripheral device to perform the image capture operation including the at least one associated attribute.

4. The method of claim 3, wherein the signaling comprises:
    a first indicator signifying a valid received preprogrammed image capture operation request; and
    a second indicator signifying an invalid received pre-programmed image capture operation request.

5. The method of claim 4, wherein at least one of the first and the second indicators is an audio indicator.

6. The method of claim 1, further comprising receiving a completion indication from the user prior to the generating of the job ticket.

7. The method of claim 1, wherein the receiving the pre-programmed image capture request from the user at the workstation includes receiving the pre-programmed image capture request from the user at the workstation connected to the peripheral device through a network.

8. A method of performing an image capture operation at a networked peripheral device, comprising:
    receiving a pre-programmed image capture operation request by the peripheral device from a user at an input/output (I/O) device adapted for the user;
    determining whether the received pre-programmed image capture operation request represents a valid request for the peripheral device to perform an image capture operation including at least one associated attribute;
    generating, by the networked peripheral device, an identification representing the valid request for performing the image capture operation in the peripheral device;
    sending, to the input/output (I/O) device, the identification representing the valid request;
    receiving, by the peripheral device, a second identification from the user; and
    if the second identification corresponds to the identification representing the valid request, performing, by the peripheral device, the image capture operation including the at least one associated attribute, wherein the networked peripheral device is capable of performing at least one of e-mailing, copying, faxing and scanning.

9. The method of claim 8, wherein the pre-programmed image capture operation request comprises at least one alphanumeric character.

10. The method of claim 8, further comprising signaling the user in response to the determining.

11. The method of claim 10, wherein the signaling comprises:
   a first indicator signifying a valid received pre-programmed image capture operation request; and
   a second indicator signifying an invalid received pre-programmed image capture operation request.

12. The method of claim 11, wherein at least one of the first and the second indicators is an audio indicator.

13. The method of claim 8, wherein the I/O device is one from a group consisting of: an interactive voice response system, large viewing screen, a screen reader, touch screen, keyboard, mouse, voice recognition system, digital ink pen, track pad, track ball and sound generating device.

14. A method of executing a job ticket in a multifunction peripheral (MFP) device, comprising:
   receiving a job ticket corresponding to an image capture operation request having at least one attribute by the MFP device from a user workstation over a network;
   determining if the image capture operation request represents at least one valid MFP device image capture function and if the at least one associated attribute is valid for the image capture function;
   if the image capture operation request is determined to be valid, generating, by the MFP device, an identifier associated with the valid image capture operation request for performing the at least one valid MFP device image capture function;
   storing the image capture operation request and the identifier at the MFP device;
   receiving input at the MFP device;
   determining whether the received input matches the identifier; and
   executing the image capture function associated with the identifier if the received input matches the identifier,
   wherein the MFP device performs at least one of e-mailing, copying, faxing and scanning.

15. The method of claim 14, further comprising:
   signaling positive feedback if the received image capture operation request matches the identifier; and
   signaling negative feedback if the received image capture operation request fails to match the identifier.

16. The method of claim 15, wherein at least one of the positive feedback and negative feedback is an audio indicator.

* * * * *